United States Patent
Hadley et al.

(10) Patent No.: US 8,291,043 B2
(45) Date of Patent: Oct. 16, 2012

(54) SYSTEM AND METHOD FOR SERVICE BULLETIN DATA EXCHANGE

(75) Inventors: Brent L. Hadley, Kent, WA (US); Joseph F. Floyd, University Place, WA (US); Jeffrey R. Kollgaard, Kent, WA (US); John R. Linn, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 12/118,055

(22) Filed: May 9, 2008

(65) Prior Publication Data
US 2009/0281688 A1 Nov. 12, 2009

(51) Int. Cl.
*G06F 15/16* (2006.01)
(52) U.S. Cl. ........ 709/218; 709/217; 709/203; 709/223; 707/705; 701/1; 701/3; 701/29
(58) Field of Classification Search .................. 709/203, 709/717, 223, 218; 707/705; 701/1, 3, 29
See application file for complete search history.

(56) References Cited

U.S. PATENT DOCUMENTS

| | | | |
|---|---|---|---|
| 6,181,992 B1 | 1/2001 | Gurne et al. | |
| 6,360,145 B1 * | 3/2002 | Robinson | 701/35 |
| 6,550,052 B1 * | 4/2003 | Joyce et al. | 717/100 |
| 6,567,079 B1 * | 5/2003 | Smailagic et al. | 345/184 |
| 7,003,374 B2 * | 2/2006 | Olin et al. | 700/213 |
| 7,275,049 B2 | 9/2007 | Clausner et al. | |
| 2002/0095476 A1 * | 7/2002 | Craik | 709/217 |
| 2002/0174112 A1 | 11/2002 | Costantino | |
| 2002/0188494 A1 | 12/2002 | Budnik et al. | |
| 2007/0115938 A1 * | 5/2007 | Conzachi et al. | 370/352 |

OTHER PUBLICATIONS

U.S. Appl. No. 11/673,685, filed Feb. 12, 2007, Jeffrey Kollgaard.
U.S. Appl. No. 12/118,037, filed May 9, 2008, Brent Hadley.

* cited by examiner

*Primary Examiner* — Haresh N Patel
*Assistant Examiner* — Mohammad Siddiqi
(74) *Attorney, Agent, or Firm* — Haynes and Boone, LLP (57) ABSTRACT

In accordance with one or more embodiments, systems and methods for exchanging data over a network include communicating with a user via a portable communication device over the network, interacting with the user via an interactive software application, receiving a request for service bulletin data related to at least one aircraft from the user via the portable communication device, accessing service bulletin data related to the at least one aircraft from a database component based on a registry number associated with the at least one aircraft passed with the request from the user, and transferring service bulletin data related to the at least one aircraft from the database component to the portable communication device via the network for viewing by the user on the portable communication device.

12 Claims, 6 Drawing Sheets

| Start tab | Zone 1A 1/2 | Zone 1A 2/2 | Zone 1B 1/4 | Zone 1B 2/4 | Zone 1B 3/4 | Zone 1B 4/4 | Zone 2 1/4 | Zone 2 2/4 | Zone 2 3/4 | Zone 2 2/4 |

Scribe Report Input Form

Model: 737
Sub model: 200
Variable NO: FN162
Current Cycles:
Airline of MRO name:
Contact Person's Name:
Contact Person's Telephone Number:
Cycle At First Scribe Opportunity Enter 5000 if unkown:

Please enter all of the data below, when complete go to each tab above and enter the appropriate scribe information. Thank you for your participation!

Zone 1A inspected ☐   Zone 1A NOT inspected ☐
Zone 1B inspected ☐   Zone 1B NOT inspected ☐
Zone 2 inspected ☐    Zone 2 NOT inspected ☐

Have All Of The Lap Joints Been Inspected For Scribe Lines? ☐

Were Scribes Found? ☐
Were Cracks Found? ☑

Add notes as needed

SYSTEM AND METHOD FOR SERVICE BULLETIN DATA EXCHANGE

CROSS-REFERENCE TO RELATED APPLICATIONS

This application is related to U.S. application Ser. No. 12/118,037, entitled "SYSTEM AND METHOD FOR DATA RETRIEVAL", filed May 9, 2008, which is incorporated herein by reference in its entirety.

TECHNICAL FIELD

The present disclosure relates generally to data retrieval and, more particularly, to service bulletin data exchange using ultra-portable device.

BACKGROUND

In the aviation industry, airline companies are provided with advisory service bulletins for facilitating maintenance, repair and service of aircraft. Some of the advisory service bulletins are provided by aircraft manufacturers based on feedback from airline service personnel and are typically prepared for specific aircraft owned by a specific airline company in response to aviation safety standards.

Service bulletins are often lengthy and complicated documents that need significant man hours for sorting and finding sections relevant to a particular aircraft. For example, a service bulletin on scribe line damage to aircraft skins can be hundreds of pages in length. Airlines need a sorting tool that quickly guides service personnel through service bulletins.

Conventional aircraft applications require entering exact configuration data of repairs on an aircraft. Entering large amounts of data, such as location, thickness, fastener type, and material type for dozens of different repairs can be taxing and error prone. In some instances, data can be entered into a laptop, but climbing on a ladder several stories high in the wind and rain while trying to enter data in a laptop or on a clipboard can be difficult.

Manufacturers and regulators need records of findings during a service bulletin inspection to assess risk. If damage is found to be a rare event, fleet inspection thresholds and inspection intervals can be adjusted accordingly to minimize cost for airlines. If damage is found to be widespread in the fleet, inspection thresholds and intervals can be shortened to maintain safe operation for the fleet as a whole. Current methods for getting this data are cumbersome and require airline personnel to record data on paper for later entry and analysis.

In general, there lacks an efficient approach for reporting and reviewing information regarding the status of aircraft (e.g., damage and/or malfunction) to enable quick dispatch of aircraft repair, service and/or maintenance. As a result, there is a need for an improved system and method for providing data and information on aircraft to service personnel for improved response to maintenance, service and repair decision-making.

SUMMARY

Systems and methods disclosed herein, in accordance with one or more embodiments, provide a point-of-use application to improve efficiency, reduce potential errors, and simplify interpretation of service bulletin instructions. Embodiments of the present disclosure provide an interactive software application that is downloadable to a portable communication device, such as a cell phone or personal digital assistant (PDA). The software application is utilized to guide a user to desirable sections of a service bulletin and prompts the user for appropriate response information, such as numeric or click-box entries to record results, voice recordings, photographs, and various other related data and information.

In accordance with one or more embodiments of the present disclosure, a system for exchanging data over a network includes a communication component adapted to exchange data with a user via a portable communication device over a network and a database component adapted to store service bulletin data related to at least one aircraft. The system includes a processing component adapted to download an interactive software application to the portable communication device, interact with the user via the interactive software application, receive a request for service bulletin data related to the at least one aircraft from the user via the portable communication device, access service bulletin data related to the at least one aircraft from the database component based on a registry number associated with the at least one aircraft passed with the request from the user, and transfer service bulletin data related to the at least one aircraft from the database component to the portable communication device via the network for viewing by the user on the portable communication device.

In various implementations, the system comprises a server, and the portable communication device comprises a cell phone or personal digital assistant. The portable communication device includes a display component that displays the service bulletin data for viewing by the user. The portable communication device includes a user input component that receives input from the user including the registry number of the at least one aircraft. The portable communication device includes a portable database component for storage of the service bulletin data related to the at least one aircraft or at least one part thereof. The service bulletin data stored in the portable database component of the portable communication device provides the user with guided interactive inspection of the at least one aircraft by viewing portions of the service bulletin data that are selectively searchable based on input by the user. User input is stored in the portable database component and transferred from the portable communication device to the processing component for storage in the database component. User input includes user answers to questions and one or more recorded results to the questions are stored in the portable database component and transferred to the processing component for storage in the database component.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

Embodiments and their advantages are best understood by referring to the detailed description that follows. It should be appreciated that like reference numerals are used to identify like elements illustrated in one or more of the figures. As used herein, the term exemplary means an example and not necessarily an ideal.

DETAILED DESCRIPTION

In accordance with one or more embodiments of the present disclosure, systems and methods disclosed herein provide for an interactive software application that is downloadable to a portable communication device, such as a cell phone or PDA, that enables quick navigation of lengthy service bulletins and airplane program documents, such as the Repair Assessment Programs, and simplified recording of data during performance of the required actions. In various implementations, embodiments of the present disclosure enable convenient, standardized entry and transmittal of aircraft data on incidence of certain types of damage and service bulletin actions to assist a user or operator with data entry about aircraft to improve fleet safety management decisions.

Figure 1:
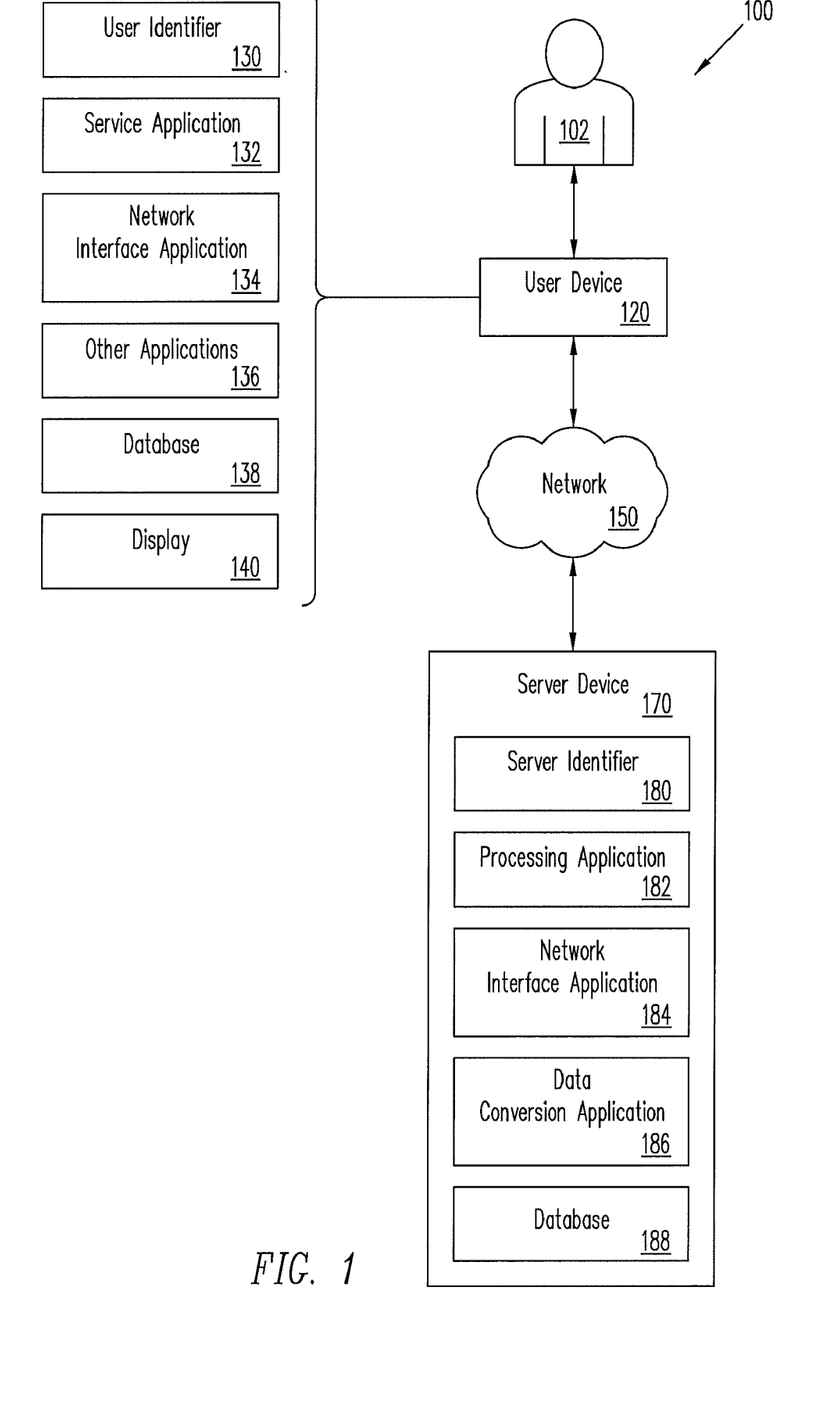
FIG. 1 shows a block diagram of a system configured to transfer service data and information over a network, in accordance with an embodiment of the present disclosure.

FIG. 1 shows one embodiment of a system 100 (e.g., an interactive communication system) to facilitate the transfer of service data and information over a network 150. As shown in FIG. 1, the system 100 includes at least one user device 120 configured to interface with a user 102 and at least one server device 170 configured to communicate with the user device 120 via the network 150.

The network 150, in one embodiment, may be implemented as a single network or a combination of multiple networks. For example, in one embodiment, the network 150 may comprise a wireless telecommunications network (e.g., cellular phone network) adapted to communicate with other communication networks, such as the Internet. In various other embodiments, the network 150 may include the Internet and/or one or more intranets, landline networks, wireless networks, and/or other appropriate types of communication networks adapted to communicate with a wireless telecommunications network.

The user device 120, in various embodiments, comprises a mobile communication device, such as an ultra-portable communication device including a cell phone, a personal digital assistant (PDA), or some other generally known type of portable communication device. The user device 120 may be implemented using any appropriate combination of hardware and/or software configured for wired and/or wireless communication over the network 150.

The user device 120, in one embodiment, may include one or more user identifiers 130, which may be implemented as operating system registry entries, identifiers associated with hardware of the user device 120, or various other appropriate identifiers. The user identifier 130 may include attributes related to the user 102, such as security information (e.g., user name, password, photograph image, biometric id, address, phone number, etc.). In various implementations, the user identifier 130 may be passed with a user service request to the server device 170, and the user identifier 130 may be used by the server device 170 to provide the user 102 with access to service data and information stored by the server device 170, in a manner as described herein.

The user device 120, in one embodiment, includes a service application 132 that may be used by the user 102 to access and/or browse service data and information made available to the user 102 by the server device 170 over the network 150. For example, the service application 132 may be implemented as a network browser to display service data and information (e.g., documents and/or files related to an advisory service bulletin (SB), a service manual or service instructions) provided by the server device 170 over the network 150. In one aspect, the service application 132 may be referred to as a cell phone application without departing from the scope of the present disclosure.

In one implementation, the service application 132 processes relevant service data and information to provide an interactive process to guide the user 102 through service and maintenance activities. The service application 132 may generate one or more records of the responses to tests, recordings, evaluations and/or assessments made by the user 102 and stores the one or more records in a local memory component, such as database 138.

In one implementation, the service application 132 provide portable access to large information data sets necessary to operate and maintain machinery, such as a commercial airplane. The service application 132 indexes and stores one or more complete manual sets necessary to maintain machinery. The manual data sets may comprise one to several million pages in printed document format. As described in greater detail herein, service manual data sets may be retrieved from the server device 170, stored locally on the user device 120, and displayed for viewing by the user 102.

In one implementation, the service application 132 comprises an interactive software application that is downloadable to the user device 120. The user device 120 is configured to display service data and information tailored to particular machinery as designated by the user 102 via entry of a registry number of the particular machinery. Any user inputted data and information (e.g., damage findings for an airplane may include scribe line damage) may be categorized and stored in the user device 120. The user inputted data and information may be transmitted to the server device 170 via the network 150 and associated with the registry number of the machinery for storage in a database of the server device 188. This data and information may be associated with an appropriate work task assigned to the particular machinery. In various implementations, the information types may be multimedia in scope (e.g., single digit, photo, formatted email, etc.). The resulting data and findings may be transmitted to one or more other server devices for long term activity performance recording and activity audit.

The user device 120, in one embodiment, may include one or more network interface applications 134, which may be used by the user 102 to display via a display component 140 (e.g., LCD) and view tasks in response to operations selected by the user 102. For example, the network application 134 may display a graphical user interface (GUI) in connection with the service application 132 for viewing of service tasks.

The user device 120, in various embodiments, may include other applications 136 as may be desired in particular embodiments to provide additional features available to the user 102. For example, such other applications 136 may include security applications for implementing client-side security features, programmatic client applications for interfacing with appropriate application programming interfaces (APIs) over the network 150 or various other types of generally known programs and/or applications.

The user device 120, in one embodiment, may include one or more databases 138 adapted to store and archive data and information including data and information from maintenance documents (e.g., advisory service bulletins). In various embodiments, the one or more databases 138 may comprise a removable memory component, such as a smart card, and/or an internal memory component, such as a ROM component. One or more sets of maintenance documents (e.g., AMM Part 1 & 2: Airplane Maintenance Manual: Part 1: Systems Description Manual and Part 2: Maintenance Practices and Procedures, IPC: Illustrated Parts Catalog, FIM: Fault Isolation Manual, Task Cards: Subset of AMM for use by Mechanic or Planner, MPD: Maintenance Planning Document, SRM: Structural Repair Manual, WDM: Wiring Diagram Manual, SSM: Systems Schematic Manual, CMM: Component Maintenance Manual, Engineering Blueprints: REDARS Parts Lists and REDARS Drawings, etc.) for machinery, such as an airplane, may be downloaded and stored on the user device 120 in database 138, which may comprise various types of memory components, such as an SD/SD micro memory card. In one aspect, the downloaded maintenance documents may be indexed in various ways using a unique indexer for optimization of fault information based retrieval. In various implementations, the indexer may use noun phrase collocation and simplified-English specific phrases and/or grammar for indexing and organization.

The server device 170, in one embodiment, may comprise a network server adapted to operate as an interactive data storage facility and communicate with the user device 120 via the network 150 by transmitting and receiving service data and information over the network 150. The server device 170 may be implemented using any appropriate combination of hardware and/or software configured for wired and/or wireless communication over the network 150. In one implementation, the server device 170 may be referred to as a service bulletin repository for recording service data and information (e.g., documents and/or files related to advisory service bulletins and service manuals) sent to and received from the user device 120. The server device 170 is configured to extract, format and provide relevant service data and information for transmission to and reception from the service application 132 of the user device 120.

The server device 170, in one embodiment, may include one or more server identifiers 180, which may be implemented, for example, as operating system registry entries, identifiers associated with hardware of the server device 170, or various other appropriate identifiers that identify the server device 170. The server identifier 180 may include attributes related to a company or organization that provides the server device 170 and/or an administrator or operator of the server device 170. The attributes may be implemented as security information (e.g., a company name, address or phone number, or operator name, password, photograph image or biometric id.). In various implementations, the server identifier 180 may be passed with a response to a user request, in a manner as described herein.

The server device 170, in one embodiment, may include a processing application 182, a network interface application 184, a data conversion application 186, and one or more databases 180. The network interface application 184, in one embodiment, may comprise a network communication device, module and/or application that allows the server device 170 to communicate with the user device 120 via the network 150 to transmit and receive service data and information. For example, in one implementation, the network interface application 184 comprises a communication component adapted to exchange data and information with the user 102 via the user device 120 over the network 150.

The processing application 182, in one embodiment, is adapted to download the service application 132 (e.g., an interactive software application) to the user device 120 (e.g., a portable communication device) over the network 150. The processing application 182 is adapted to interact with the user 102 via the interactive service application 132 to exchange data, such as service bulletin data, with the user device 120 over the network 150. The processing application 182 is adapted to receive a request for service bulletin data related to at least one machine (e.g., an aircraft) from the user 102 via the user device 120. The processing application 182 is adapted to access service bulletin data related to the at least one machine from the database 188 based on a registry number, for example, associated with the at least one machine passed with the request from the user 102. The processing application 182 is adapted to transfer service bulletin data related to the at least one machine from the database 188 to the user device 120 via the network 150 for viewing by the user on the display 140 of the user device 120. It should be appreciated that, in one aspect, the processing application 182 may be referred to as a central server application without departing from the scope of the present disclosure.

The data conversion application 186, in one embodiment, may comprise a data conversion mechanism or module that allows translation of part identification numbers into user readable information that may reference maintenance, service and repair procedures from locally stored documents and/or files related to advisory service bulletins and/or service manuals. In one implementation, the user 102 may input into the user device 120 a part number from a particular part of the machinery, such as airplane, and access specific topics in the service manual for specific information related to maintenance, service and/or repair procedures for that specific part. This allows the user to quickly identify and research the particular part directly in data and information stored locally on the user device 120, such as a cell phone.

The database 188, in one embodiment, comprises one or more databases adapted to store and archive data and information including data and information from maintenance documents (e.g., advisory service bulletins and/or service manuals). As such, in one implementation, the database 188 is adapted to store service bulletin data related to at least one machine, such as an airplane or various other types of aircraft. One or more sets of maintenance documents (e.g., AMM Part 1 & 2, IPC, FIM, Task Cards, MPD, SRM, WDM, SSM, REDARS drawings, CMM's, REDARS Parts Lists, etc.) for machinery, such as an airplane, may be downloaded and stored on the user device 120 in database 138, which may comprise various types of memory components, such as a hard drive. The maintenance documents may be indexed in various ways using a unique indexer for optimization of fault information based retrieval. In various implementations, the indexer may use noun phrase collocation and simplified-English specific phrases and/or grammar for indexing and organization.

Figure 2A:
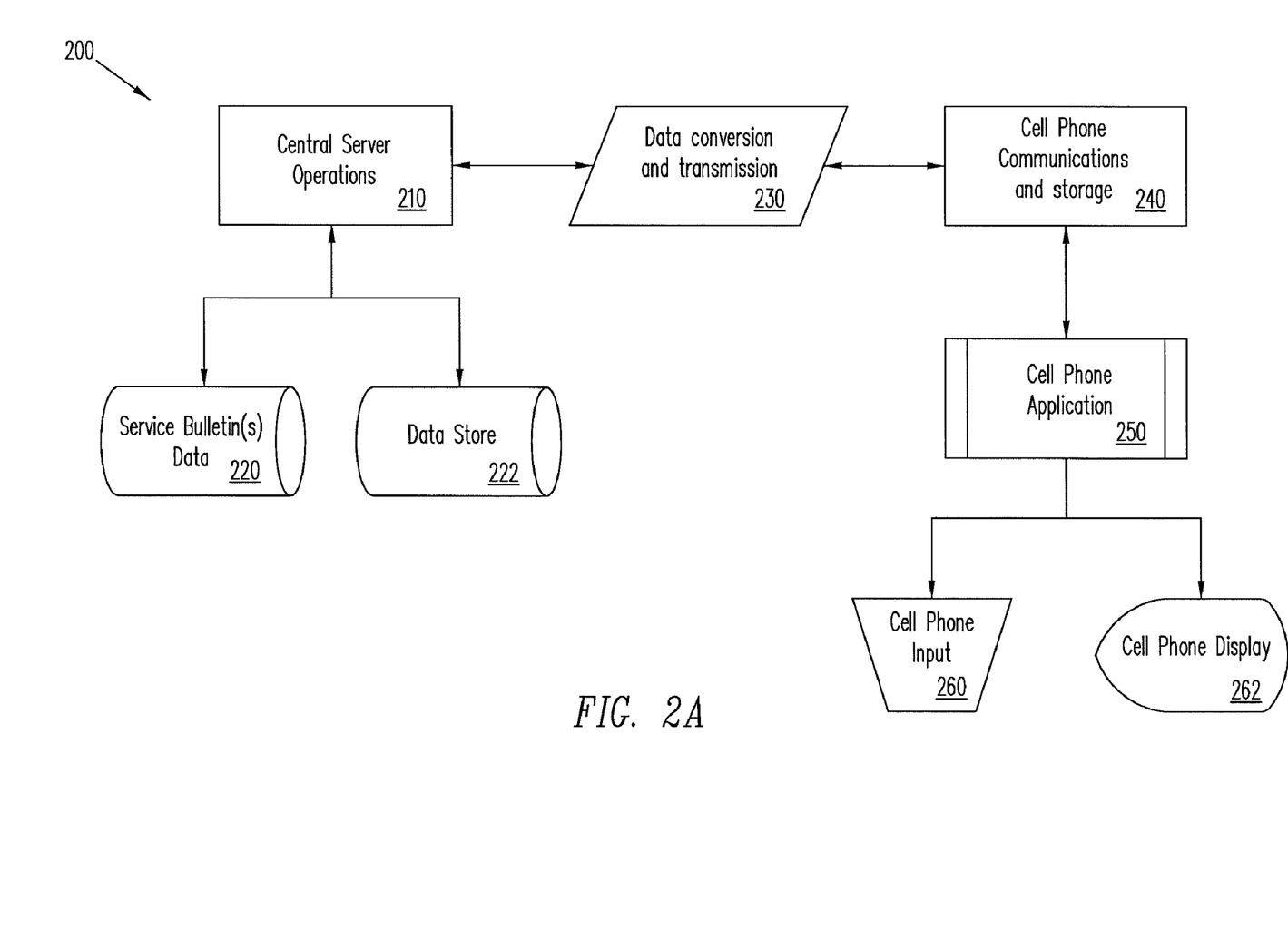
FIG. 2A shows a block diagram of a method for facilitating transfer of data and information over a network, in accordance with an embodiment of the present disclosure.

FIG. 2A shows one embodiment of a method 200 for facilitating the transfer of service bulletin data and information over the network 150. The method 200 involves a central server operation 210, such as server device 170 of FIG. 1, adapted to extract, format and provide relevant service bulletin data and information for transmission to and reception from a cell phone application 250 (e.g., service application 132 of FIG. 1). Service bulletin data and other data related thereto is stored in a service bulletin repository 220 and/or data store 222, which are adapted to store data and information sent to and received from the cell phone application 250 of the user device 120.

In one implementation, the cell phone application 250 processes relevant service bulletin data and information to provide an interactive process to guide the user 102 through service bulletin activities. During these processes, the cell phone application 250 generates one or more records of responses to tests, recordings, evaluations and assessments made by the cell phone application user 102. The resulting data and findings are categorized and recorded on the cell phone via cell phone storage 240. This data may be associated with one or more appropriate work tasks at any given time. The information types may be multimedia in nature (e.g., single digit, T9, photo, formatted email). The resulting data and findings may be transmitted to the central server operations 210 via cell phone communications 240 and data conversion and transmission 230 for long term activity performance recording and activity audit.

Figure 2B:
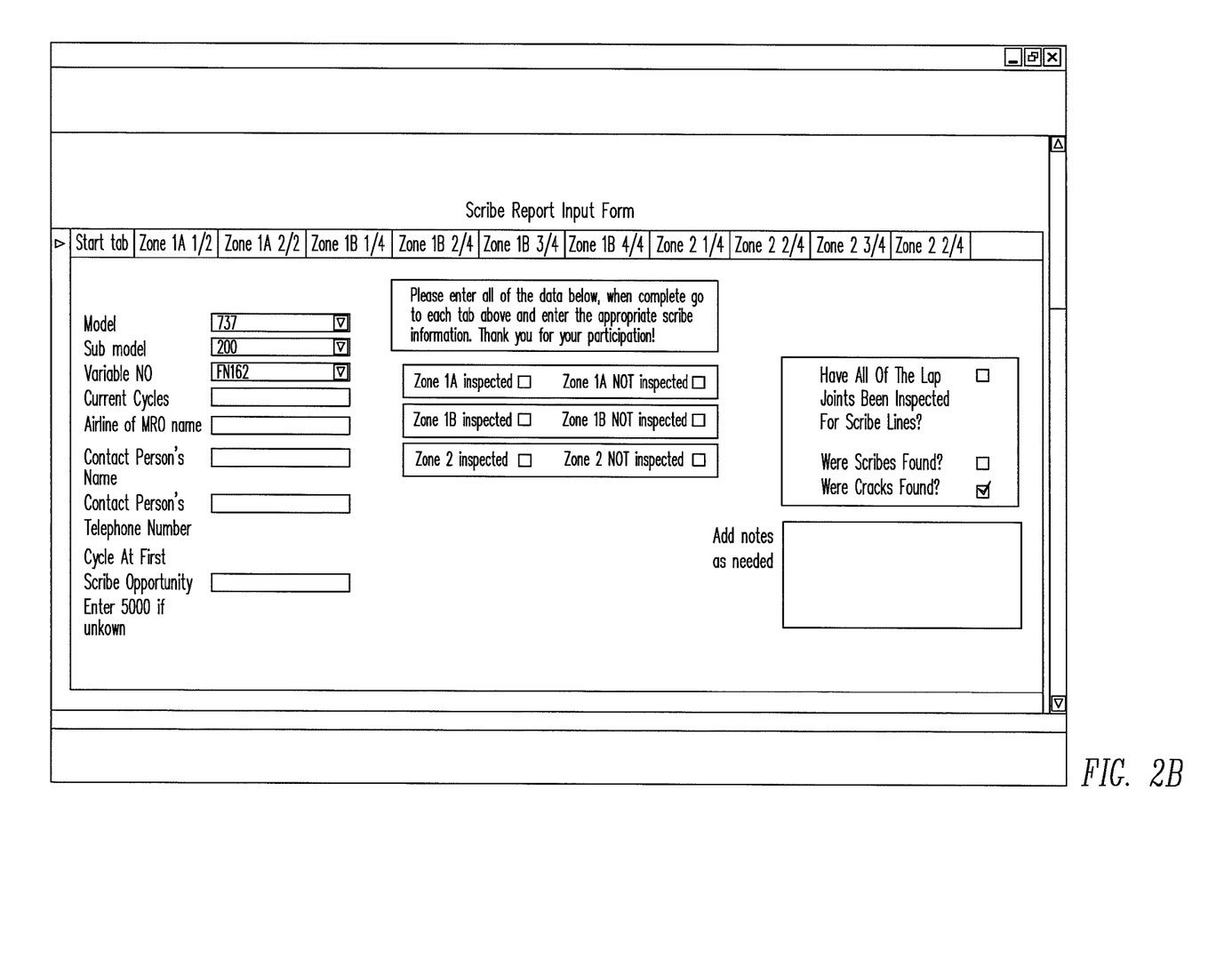
FIG. 2B shows an exemplary representation of an interactive software application menu, in accordance with an embodiment of the present disclosure.

In one implementation, the cell phone application 250 (e.g., service application 132 of FIG. 1) comprises interactive software application, such as a graphical user interface (GUI) 280 of FIG. 2B, that is downloadable to a cell phone, such as user device 120 of FIG. 1. In reference to FIGS. 2A and 2B, the cell phone application 250 displays, via a cell phone display 262, service bulletin data and information tailored to a particular aircraft identified by user input, via cell phone input 260, of an entered registry number of the user's particular aircraft. The resulting data and information on damage findings (e.g., scribe line damage) is transmitted and associated with the registry number for storage in a database, such as data store 222. Further description follows in greater detail in reference to FIG. 3.

Figure 3:
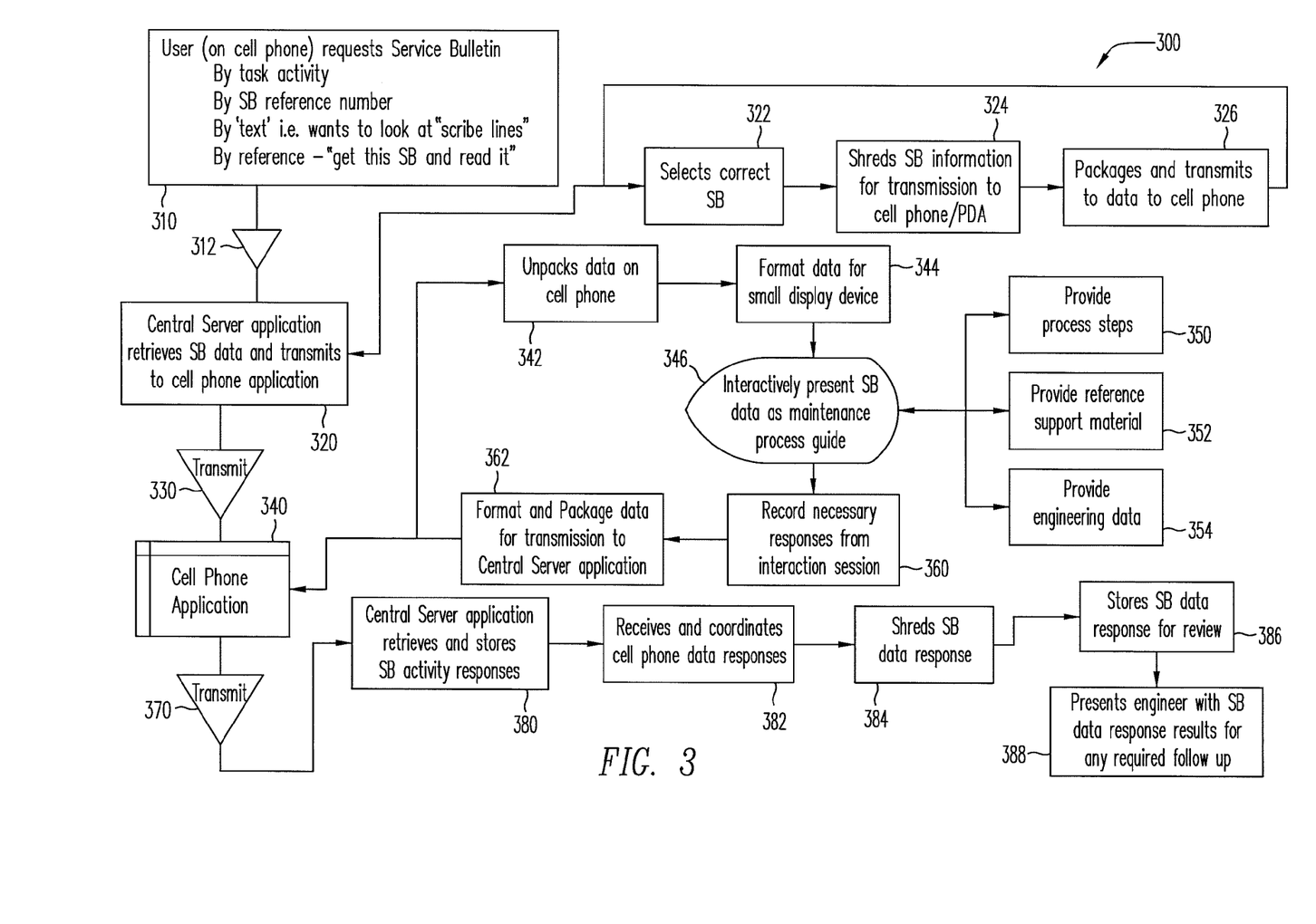
FIG. 3 shows a block diagram of a process for exchanging data and information over a network, in accordance with an embodiment of the present disclosure.

FIG. 3 shows one embodiment of a process 300 for facilitating the exchange of service bulletin data and information between the user device 120 and the server device 170 over the network 150 of FIG. 1. In one implementation, the user 102 interacts with the user device 120 to request service bulletin data and information from the server device 170 (block 310). In various embodiments, the service bulletin data and information may be requested by a task activity, by a service bulletin reference number, by text or a keyword, and/or by reference phrase. The request is transmitted (block 312) over the network 150 from the user device 120 to the server device 170. The processing application 182 (i.e., central sever application) of the server device 170 retrieves the requested service bulletin data and information and then transmits this data and information to the service application 132 of the user device 120 (block 320). In one embodiment, the service application 132 selects a correct service bulletin (block 322), shreds the service bulletin data and information for transmission to the user device 120 (block 324), and packages the service bulletin data and information to the user device 120 via the network 150 (block 326). The retrieved service bulletin data and information is transmitted from the server device 170 to the user device 120 (block 330).

Next, the service application 132 of the user device 120 receives the service bulletin data and information from the server device 170 via the network 150 (block 340). The service application 132 unpacks the data and information (block 342), formats the data and information (block 344), and interactively presents the service bulletin data and information to the user 102 as a maintenance process guide (block 346). In various implementations, the maintenance process guide is adapted to provide interactive process steps to the user 102 (block 350), provide interactive reference support material to the user 102 (block 352), and/or provide interactive relevant engineering data to the user 102 (block 354).

Next, the service application 132 of the user device 120 records necessary responses of the user 102 from the interactive session with the user 102 (block 360). The service application 132 then formats and packages the recorded response data for transmission to the server device 170 (block 362). Next, the service application 132 transmits the packaged response data to the server device 170 via the network 150 (block 370).

Next, the processing application 182 of the server device 170 retrieves and stores the service bulletin activity responses from the user 102 as received from the user device 120 via the network 150 (block 380). The processing application 182 receives and coordinates user input responses, such as cell phone data responses (block 382). The processing application 182 shreds the service bulletin data responses (bock 384) and stores the service bulletin data responses for review and analysis (block 386). The processing application 182 then presents an operator (e.g., service administrator or engineer) with the service bulletin data response results (block 388), which may be used for any necessary follow-up.

Figures 4A, 4B, 5:
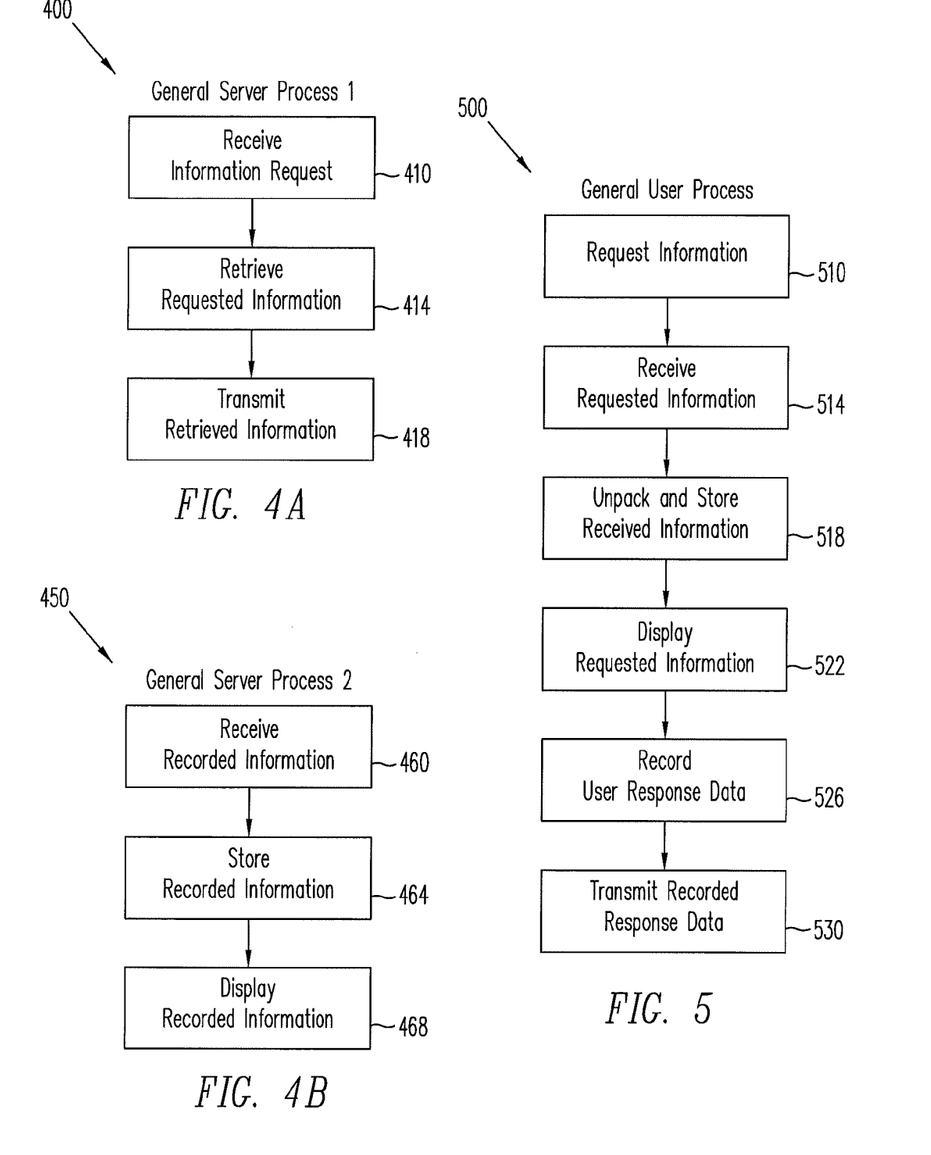
FIG. 4A shows a block diagram of a method for providing service information to a user, in accordance with an embodiment of the present disclosure.
FIG. 4B shows a block diagram of a method for receiving archival information from a user, in accordance with an embodiment of the present disclosure.
FIG. 5 shows a block diagram of a method for viewing service information by a user, in accordance with an embodiment of the present disclosure.

FIG. 4A shows one embodiment of a method 400 for providing service information to the user 102. FIGS. 1 and 2 are referenced in the description that follows. In one implementation, the server device 170 is adapted to receive an information request from the user 102 via the user device 120 (block 410). In one aspect, the requested information may include advisory service bulletin data and information and/or service manual data and information. The server device 170 is adapted to retrieve the requested data and information from the one or more databases 188 (block 414). In one aspect, retrieval may include selecting an appropriate advisory service bulletin for a specific airplane as provided by the user 102 via the user device 120. The server device 170 is adapted to provide the retrieved data and information to the user device 120 via the network 150 (block 418). In one aspect, the advisory service bulletin data and information may be packed or packaged (e.g., using a generally known data communication protocol) for transmission to the user device 102 via the network 150.

FIG. 4B shows one embodiment of a method 450 for receiving archival information from the user 102. FIGS. 1 and 2 are referenced in the description that follows. In one implementation, the server device 170 is adapted to receive recorded information from the user 102 via the user device 120 (block 460). In one aspect, the recorded information may reference advisory service bulletins and include recorded responses and recorded results as inputted by the user 102 to status questions in reference to tasks related to advisory service bulletins. The server device 170 is adapted to store (e.g., archive) the received information in the database 188 for review (block 464). The server device 170 is adapted to provide an operator or an administrator with recorded responses and recorded results for review (block 468). For example, an operator may access the recorded data and information from the database 188 and view the data and information on a display component of the server device 170. In another example, the recorded data and information may be used for statistical analysis.

FIG. 5 shows one embodiment of a method 500 for viewing service information by the user 102. FIG. 1 is referenced in the description that follows. In one implementation, the service application 132 of the user device 120 is adapted to interface with the user 102 and request data and information from the server device 170 as requested by the user 102 (block 510). In one example, as shown in FIG. 5A, the user 102 may speak to the user device 120, such as a cell phone, and generate a request for data and information that may be transmitted to the server device 170 via the network 150. As previously described, the requested information may include advisory service bulletin data and information and/or service manual data and information.

The service application 132 is adapted to receive the requested data and information from the server device 170 via the network 150 (block 514). The service application 132 is adapted to unpack the data and information (e.g., using a generally known data protocol) and format the unpacked data and information for storage in the database 138 of the user device 120 (block 518). In one example, as shown in FIG. 5A, the user device 120, such as a cell phone, includes the removable database 138 to store data and information received from the server device 170 via the network 150.

The service application 132 is adapted to display the data and information to the user via the display component 140 of the user device 120 (block 522). In one example, as shown in FIG. 5A, the user device 120, such as a cell phone, includes the display component 140 to display data and information received from the server device 170 via the network 150.

In one aspect, the requested data and information is interactively displayed and presented as a maintenance process guide that allows the user 102 to selectively view, search and/or select one or more portions of data and information from advisory service bulletins and/or service manuals downloaded from the server device 170 using the method 300 of FIG. 3A. In one example, as shown in FIGS. 5B-5C, the search application 132 of the user device 120 includes a search component that allows the user 102 to search and select topics from the data and information received from the server device 170 via the network 150.

In another aspect, the interactively presented data and information provides procedural steps, reference support material and/or engineering data for maintenance, service and repair of machinery, such as an airplane. In one example, as shown in FIG. 5D, the search application 132 of the user device 120 allows the user 102 to search and select sub-topics, such as specific maintenance and inspection practices and procedures for selected topics, from the data and information received from the server device 170 via the network 150. As shown in FIGS. 5E-5F, portions of the data and information received from the server device 170 may be printed or viewed by the user 102. FIG. 5G shows one embodiment of a portion of the data and information received from the server device 170 that may be printed or viewed by the user 102.

In various implementations, the service application 132 is adapted to record responses as inputted by the user 102 during an interactive session (block 526). In one aspect, the responses from the user 102 comprises data and information that may be stored in the database 138 of the user device 120. The service application 132 is adapted to format and package the recorded data and information for transmission to the server device 170 via the network 150 (block 530). In one aspect, data and information related to the recorded responses of the user 102 may be packed or packaged (e.g., using a generally known data communication protocol) for transmission to the server device 170 via the network 150.

Figure 6:
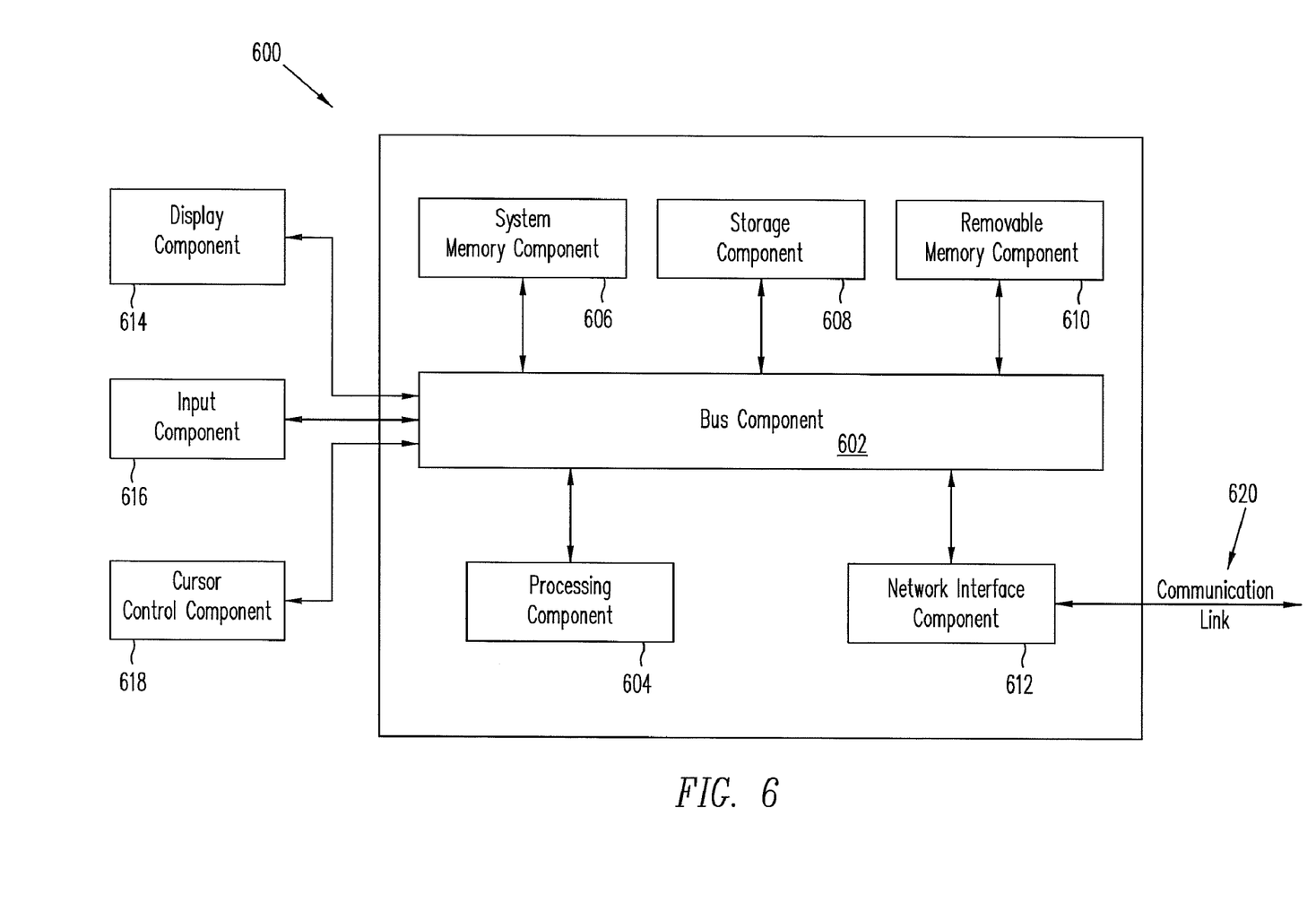
FIG. 6 is a block diagram of a computer system suitable for implementing one or more embodiments of the present disclosure.

FIG. 6 is a block diagram of a computer system 600 suitable for implementing embodiments of the present disclosure. Computer system 600 includes a bus 602 or other communication mechanism for communicating information, which interconnects subsystems and components, such as processor 604, system memory component 606 (e.g., RAM), static storage component 608 (e.g., ROM), removable memory component 610 (e.g., removable ROM memory, such as EEPROM, smart card, flash memory, etc.), wired or wireless communication interface 612 (e.g., transceiver, modem or Ethernet card), display component 614 (e.g., LCD), input component 616 (e.g., keyboard, microphone, touch screen on display), and cursor control component 618 (e.g., mouse button).

In accordance with embodiments of the invention, computer system 600 performs specific operations by processor 604 executing one or more sequences of one or more instructions contained in system memory component 606. Such instructions may be read into system memory component 606 from another computer readable medium, such as static storage component 608 or removable memory component 610. In other embodiments, hard-wired circuitry may be used in place of or in combination with software instructions to implement the invention.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes removable storage media, such as removable memory component 610, volatile media includes dynamic memory, such as system memory component 606, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the invention, execution of instruction sequences to practice the invention may be performed by computer system 600. In various other embodiments of the invention, a plurality of computer systems 600 coupled by communication link 620 (e.g., wireless cell phone network, wireless or wired LAN, PTSN, or various other wireless networks) may perform instruction sequences to practice the invention in coordination with one another.

Computer system 600 may transmit and receive messages, data, information and instructions, including one or more programs (i.e., application code) through communication link 620 and communication interface 612. Received program code may be executed by processor 604 as received and/or stored in removable memory component 610 or some other non-volatile storage component for execution.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system for exchanging data over a network, the system comprising:
    a communication component for exchanging data with a user via a cellular telephone over a network;
    a system database component for storing service bulletin data related to at least one aircraft; and
    a processing component, the processing component being hardware, to:
        download an interactive software application to the cellular telephone,
        interact with the user via the interactive software application to provide an aircraft maintenance guide for a desired maintenance task,
        receive spoken requests and textual requests for service bulletin data related to the at least one aircraft from the user via the cellular telephone,
        access service bulletin data related to the at least one aircraft from the database component based on a registry number associated with the at least one aircraft passed with the requests from the user,
        transfer service bulletin data related to the at least one aircraft from the database component to the cellular telephone via the network for viewing by the user on the cellular telephone; and
        receive service bulletin activity responses from the user's cellular telephone, the responses including reports of aircraft damage found pursuant to the interaction with the user via the interactive software application, the user's cellular telephone including a portable database component for storage of the service bulletin data related to the at least one aircraft or at least one part thereof, and the service bulletin data stored in the portable database component of the user's cellular telephone providing the user with a guided interactive inspection of the at least one aircraft by viewing portions of the service bulletin data that are selectively searchable based on input by the user.

2. The system of claim 1, wherein the system comprises a server.

3. The system of claim 1, wherein the service bulletin activity responses from the user includes user answers to questions and one or more recorded results to the questions that are stored in the portable database component and transferred to the processing component for storage in the system database component.

4. A method for exchanging data over a network, the method comprising:
    communicating with a user via a cellular telephone over the network;
    downloading an interactive software application to the cellular telephone;
    interacting with the user via the interactive software application to provide an aircraft maintenance guide for a desired maintenance task;
    receiving spoken requests and textual requests for service bulletin data related to the at least one aircraft from the user via the cellular telephone;
    accessing service bulletin data related to the at least one aircraft from a database component based on a registry number associated with the at least one aircraft passed with the requests from the user;
    transferring service bulletin data related to the at least one aircraft from the database component to the cellular telephone via the network for viewing by the user on the cellular telephone, the user's cellular telephone including a portable database component for storage of the service bulletin data related to the at least one aircraft or at least one part thereof, and the service bulletin data stored in the portable database component of the user's cellular telephone providing the user with a guided interactive inspection of the at least one aircraft by viewing portions of the service bulletin data that are selectively searchable based on input by the user; and
    receiving service bulletin activity responses from the user's cellular telephone, the responses including reports of aircraft damage found pursuant to the interaction with the user via the interactive software application.

5. The method of claim 4, wherein the method is performed by a server in communication with the cellular telephone over the network.

6. The method of claim 4, further comprising displaying the service bulletin data to the user via a display component of the cellular telephone.

7. The method of claim 4, further comprising storing the service bulletin data in a portable database component of the cellular telephone.

8. The method of claim 4, receiving input from the user including the registry number of the at least one aircraft.

9. The method of claim 4, further comprising providing the user with guided interactive inspection of the at least one aircraft by allowing the user to selectively view portions of the service bulletin data.

10. The method of claim 9, wherein the portions of the service bulletin data are selectively searchable based on input by the user.

11. The method of claim 10, further comprising storing the service bulletin activity responses from the user in the database component.

12. The method of claim 10, wherein the service bulletin activity responses from the user includes user answers to questions and one or more recorded results to the questions.

* * * * *